United States Patent [19]

Hill et al.

[11] Patent Number: 4,897,830
[45] Date of Patent: Jan. 30, 1990

[54] OPTICAL NETWORKS

[75] Inventors: Godfrey R. Hill, Ipswich; David W. Smith, Woodbridge; Ian W. Stanley, Ipswich, all of England

[73] Assignee: British Telecommunications, public limited company, United Kingdom

[21] Appl. No.: 915,034

[22] PCT Filed: Jan. 10, 1986

[86] PCT No.: PCT/GB86/00017
§ 371 Date: Aug. 25, 1986
§ 102(e) Date: Aug. 25, 1986

[87] PCT Pub. No.: WO86/04205
PCT Pub. Date: Jul. 17, 1986

[30] Foreign Application Priority Data
Jan. 10, 1985 [GB] United Kingdom ............... 8500635

[51] Int. Cl.$^4$ ............................................. H04B 9/00
[52] U.S. Cl. ........................................ 370/4; 455/606; 455/617; 370/3
[58] Field of Search .......................... 370/1, 3, 57, 4; 455/606, 607, 53, 612, 617, 619, 618

[56] References Cited
U.S. PATENT DOCUMENTS

| | | |
|---|---|---|
| 4,434,510 | 2/1984 | Lemelson . |
| 4,530,084 | 7/1985 | Strebel et al. ...................... 455/607 |
| 4,601,027 | 7/1986 | Scarr et al. ............................. 370/3 |
| 4,635,246 | 1/1987 | Taylor et al. ....................... 455/619 |
| 4,686,667 | 9/1987 | Ohnsorge . |

FOREIGN PATENT DOCUMENTS

| | | |
|---|---|---|
| 4286385 | 5/1985 | Australia . |
| 0077292 | 4/1983 | European Pat. Off. . |
| 0131818 | 1/1985 | European Pat. Off. . |
| 2436265 | 2/1976 | Fed. Rep. of Germany . |
| 2555458 | 6/1977 | Fed. Rep. of Germany ........ 370/57 |
| 3220817 | 8/1983 | Fed. Rep. of Germany . |

OTHER PUBLICATIONS

Rocks–"Optische multiplex-Systeme"–Frequenz–vol. 36, #12, Dec. 1982, Berlin (DE) pp. 319–327.
Cheng et al. "Subscriber Loop Architecture", AT&T Disclosure #75 Sep. 1984, pp. 9–10.
Brosio et al., CSELT Rapporti Tecnici–vol. VIII #4, Dec., pp. 259–261, "A low Consumption Light Powered Telephone on Optical Fiber".

Primary Examiner—Robert L. Griffin
Assistant Examiner—L. Van Beek
Attorney, Agent, or Firm—Nixon & Vanderhye

[57] ABSTRACT

An optical network comprises a plurality of transmitting ($T_n$) and receiving ($R_n$) terminals; and cross-coupling means (2), the transmitting ($T_n$) and receiving ($R_n$) terminals being optically coupled with the cross-coupling means whereby modulated carrier signals transmitted from each transmitting terminal ($T_n$) are fed to each receiving terminal ($R_n$) via the cross-coupling means (2). A plurality of first sources (4, 7) of optical signals are grouped together remotely from and optical coupled with the transmitting ($T_n$) and receiving ($R_n$) terminals to supply carrier signals and tuning signals to the transmitting and receiving terminals respectively.

12 Claims, 4 Drawing Sheets

OPTICAL NETWORKS

FIELD OF THE INVENTION

The invention relates to optical networks comprising a plurality of transmitting and receiving terminals; cross-coupling means, the transmitting and receiving terminals being optically coupled with the cross-coupling means whereby modulated carrier signals transmitted from the transmitting terminals are fed to the receiving terminals via the cross-coupling means; selection means associated with each receiving terminal to select the modulated carrier signal to be received; and a plurality of first sources of optical signals optically coupled with the transmitting terminals to supply carrier signals to the transmitting terminals. Such optical networks are hereinafter referred to as of the kind described.

BACKGROUND AND SUMMARY OF THE INVENTION

A simple form of optical network of the kind described includes an optical source (typically a laser) and a modulator at each transmitting terminal and a second optical source together with homodyne or heterodyne detecting apparatus at each receiving terminal. The optical sources associated with the transmitting terminals each provide carrier signals with different wavelengths which are modulated by an information signal and then transmitted to the cross-coupling means. This distributes the received modulated carrier signals equally between all receiving terminals. In order to receive a transmitted signal, the optical source associated with a receiving terminal is tuned appropriately.

A practical difficulty of building a network of the kind described above is that each laser associated with a transmitter must be referenced to the other to prevent cross-talk interference. Thus, if one carrier signal laser were to drift not only would the receiving terminal have to follow it, but beyond certain limits it would cause interference with other channels. Clearly it is very difficult to reference this large number of optical sources.

In accordance with the present invention, in an optical network of the kind described, the plurality of first souces of optical signals optically coupled with the transmitting terminals are grouped together.

In this arrangement the referencing of the first optical sources is much less difficult since the sources are grouped together, preferably at a central location. Also, the terminal equipment is simplified so that only a modulator is required in the transmitting terminal. A further advantage is that the grouped components can be put on an optical integrated circuit.

Where the network is to be used solely in a broadcast configuration, the transmitting terminals may be grouped together with the first sources of optical signals. In other arrangements, however, the first sources are grouped together remotely from the transmitting and receiving terminals.

In some cases, the selection means may comprise a wavelength selector such as a grating demultiplexer thus allowing direct detection to be achieved. Conveniently, this selection means is located adjacent the grouped first sources.

In another example, the selection means comprises a plurality of second sources of optical signals grouped together remotely from and optically coupled with the receiving terminals to supply tuning signals to the receiving terminals.

In one example, respective first and second sources of optical signals are coupled with each of the receiving and transmitting terminals. In this example, each of the optical sources coupled with the receiving terminals is preferably tunable in order to select the channel which is received by the corresponding receiving terminal. This is particularly useful in the case of for example a cable TV network where a particular receiving terminal may only receive certain channels.

In another example, the network further comprises switch means for optically coupling selected ones of the first optical sources with selected transmitting terminals.

In this example, where second optical sources are provided, the switch means is conveniently adapted to optically couple selected ones of the second optical sources with selected receiving terminals.

In most cases, there will be one first optical source for each transmitting terminal and, where appropriate, one second optical source for each receiving terminal. In some cases, however, there may be a fewer number of otical sources than terminals. In these cases, it is preferable if the switch means is operable on a time sharing basis.

The provision of switch means provides a more versatile arrangement than the previous example since each optical source can be of a fixed wavelength but may be fed to any of the receiving and transmitting terminals upon appropriate operation of the switch means. In the case where first and second optical sources are provided, these are conveniently arranged in pairs of transmit and receive sources separated in wavelength by the IF frequency to enable heterodyne detection to be carried out. The switch means controls not only which pair of optical sources are selected but also the transmitting and receiving terminals to which they are connected.

Since the switch means only operates on unmodulated carrier signals, if any cross-talk exists it is likely to be less troublesome than in arrangements where the information signal is being switched. If the switch means is polarisation sensitive in its performance (e.g. LiNbO$_3$) then there is a good prospect that the polarisation can be closely controlled because the optical source and switch means are conveniently sited together. For example, the optical sources and switch means may be connected together by a short length of optical fibre which could be polarisation holding without incurring a high cost penalty.

In most practical situations, the network will include one or more transmitting/receiving stations each comprising a pair of transmitting and receiving terminals. This may be, for example, a telephone network.

In this situation, it will normally be necessary to provide three optical waveguides for each station. That is, one to conduct the carrier signal to the transmitting terminal, one to carry the modulated carrier signal to the cross-coupling means and one to carry a signal from the cross-coupling means to the receiving terminal.

Preferably, therefore, the or each station is connected with the first and second sources via a single duplex optical waveguide, the network further comprising wavelength multiplexing means for feeding multiplexed carrier and tuning signals from the first and second optical sources to the or each single optical waveguide. With this arrangement, the number of optical waveguides can be reduced to one thus simplifying the network structure and requiring the simple addition of a conventional wavelength multiplexer.

The only disadvantage of the network described above arises when a large number of terminals are involved. This is because large losses may occur.

To deal with this optical amplifiers could be used. Alternatively one of the first sources may be arranged to feed a common optical carrier signal to all the transmitting terminals, the network further comprising a plurality of auxiliary receiving terminals grouped together for receiving a modulated common carrier signal from respective transmitting terminals and for controlling modulating means to modulate another carrier signal associated with the transmitting terminal in response to the received modulated common carrier, the modulated associated carrier signal being fed to the cross-coupling means.

Referencing a bank of optical sources (such as lasers) will add a degree of complexity and cost to an optical system, especially if the bank needs referencing to other remote banks. Hence a central referencing system is attractive. If the optical sources are sited remote from the star point (i.e. the position in the network where the signals are distributed) at say a parent exchange not only are many optical waveguides needed to carry the reference signals individually to the star point but also polarisation control becomes more difficult as, for example, the performance of a $L_iN_bO_3$ switch is polarisation dependent. Alternatively, a wavelength multiplex might be formed to carry the signals over a single waveguide and then each carrier separated by a demultiplexer before being fed to the switch means (if present). However with closely spaced carriers this too appears difficult.

Preferably, the network further comprises locking means for maintaining the wavelength of the optical signals from the first optical sources substantially constant. For example, a set of semiconductors lasers may be locked at frequencies offset from a stabilised and central reference such as a HeNe. The locking could be by opto-electronic phase locked loop or by injection locking lasers with a frequency shift by optical or electrical means. Alternatively it may be possible to generate a referenced set of carriers at a central point, to transmit these as a wavelength multiplex over a tree structured waveguide network to the star points and to use them to lock a set of lasers sited at the star point.

Conveniently, therefore the locking means comprises a plurality of second, remote sources of optical signals for supplying reference carrier signals with respective unique identifiers to the first sources, the network further comprising tuning control means for adjusting the output of the first sources to correspond with identified reference signals.

The identifiers could be, for example, by frequency modulation of the optical sources with a set of low frequency orthogonal signals. At the star point each first source locks on to one of the reference carriers and also bears the identifier imprint. This can be read and used to indicate to the local tuning control means whether returning needs to take place. As returning can take place before the switch means operates (when present), spurious laser signals can be prevented from appearing in the signal network. Additional benefits from this type of scheme are (1) the first sources can be tuned to any of the incoming refrence carriers and this gives an extra degree of flexibility in the network operation;

(2) as the identifiers must form an othogonal set, it may be possible to modulate these to provide additional information channels, for example, for control signals.

In theory, the optical waveguides used to couple the terminals and sources may comprise multimode optical fibres. Preferably, however, monomode optical fibres are used in view of their high bandwidth potential and low power loss.

Furthermore, although in theory incoherent light could provide the optical signals it is preferable for these to be at least temporally coherent and conveniently the sources of optical signals comprise lasers.

In this specification the term optical is intended to refer to that part of the electro-magnetic spectrum which is generally known as the visible region together with those parts of the infra-red and ultra-violet regions at each end of the visible region which are capable of being transmitted by dielectric optical waveguides such as optical fibres.

The cross-coupling means may be arranged to cause modulated carrier signals from each transmitting terminal to be fed to each receiving terminal. Other arrangements are possible and indeed the cross-coupling means may be connected additionally to further cross-coupling means of other networks.

BRIEF DESCRIPTION OF THE DRAWINGS

An example of a known optical network and some examples of networks in accordance with the present invention will now be described with reference to the accompanying drawings, in which.

DETAILED DESCRIPTION

Figure 1:
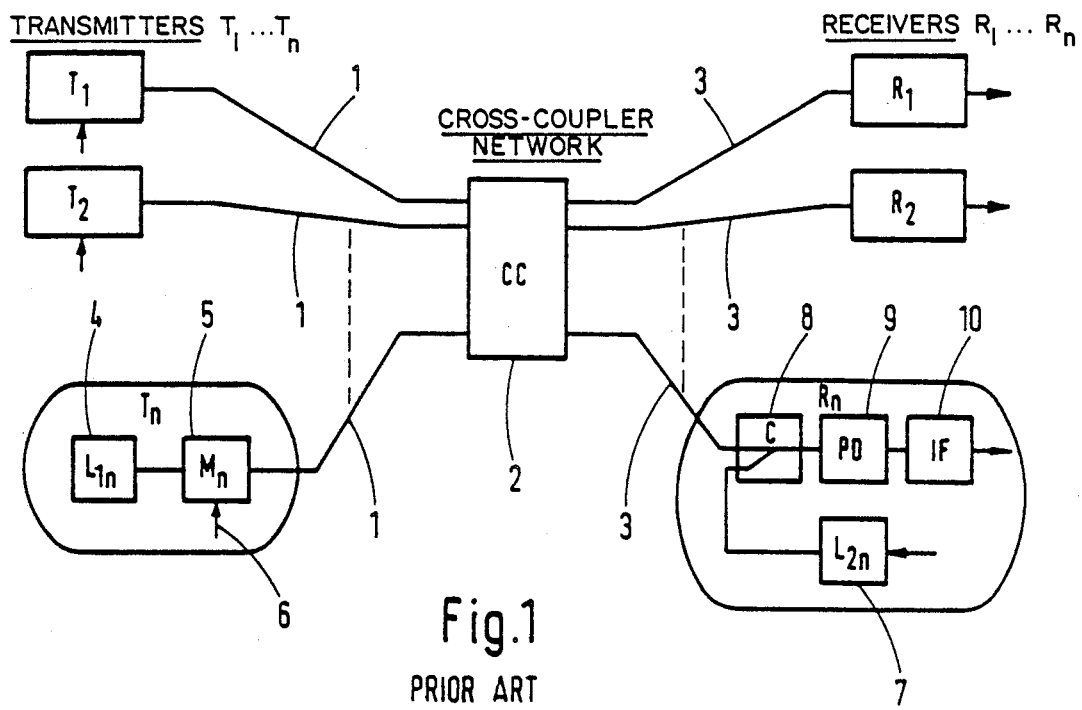
FIG. 1 illustrates a known network.

The network illustrated in FIG. 1 comprises a plurality of transmitters $T_1$–$T_n$ each of which is coupled by respective monomode optical fibres 1 to a cross-coupler network 2. The network 2 causes a proportion of any one input to the network to appear at each of its outputs so that a wavelength multiplex is formed at each output. Each output of the network 2 is fed via respective monomode optical fibres 3 to receivers $R_1$–$R_n$.

Each transmitter includes a laser 4 which generates a temporally coherent optical carrier signal having a wavelength unique to that transmitter, the carrier signal being fed to a modulator 5 which is controlled by an information signal indicated at 6 to modulate the carrier signal in accordance with the information of the information signal. Each receiver comprises a narrow linewidth laser 7 which is added to the low level incoming signal on the optical fibre 3 in a coupler 8. The wavelengths of the two lasers 4, 7 are controlled to be either identical (for homodyne detection) or to have a small frequency difference equal to an electrical IF (for heterodyne detection). In this example, heterodyne detection is shown. A photodiode 9 is provided having a square law characteristic so that it acts as a mixer to produce a different frequency at it electrical output. A conventional electrical IF processor and detector 10 are provided to generate an output signal relating to the original information signal 6.

The laser 7 in each receiver is tunable so that it can tune in to any one of the transmission signals. Providing the channel spacing is greater than the photodiode electrical bandwidth then only a single channel is received.

In a practical system, one transmitter and one receiver would be associated in one station.

Figure 2:
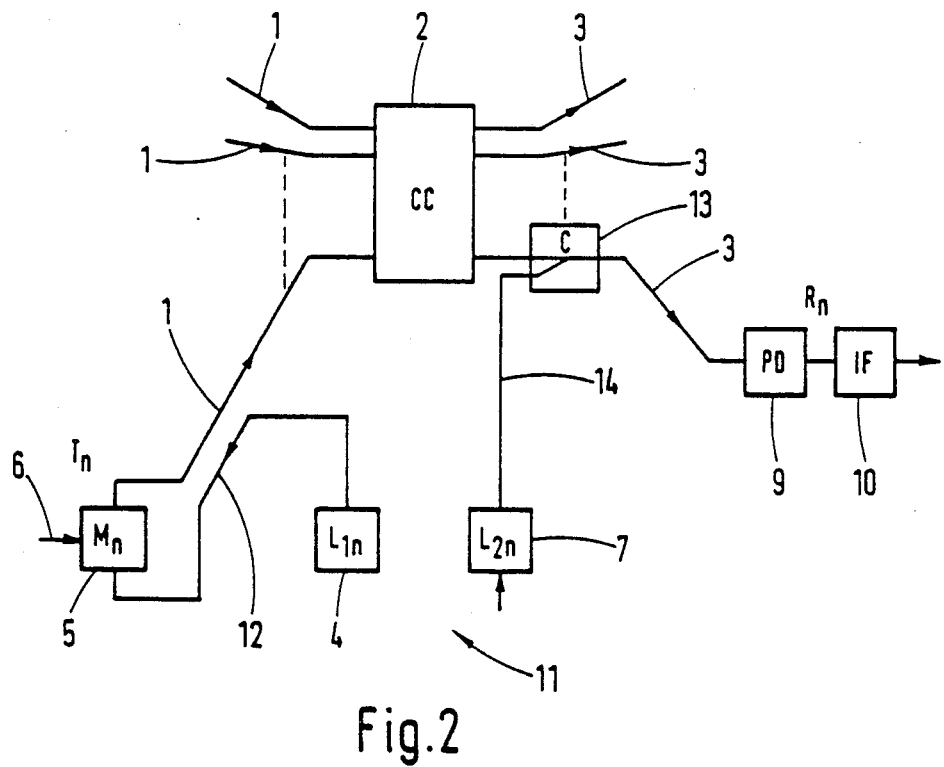
FIG. 2 illustrates a portion of one example of a network according to the invention.

The difficulty with networks as shown in FIG. 1 is that each laser 4, 7 must be referenced to the others to prevent cross-talk interference. The invention provides a solution to this by grouping together the lasers as shown in FIG. 2. The arrangement shown in FIG. 2 is identical to that shown in FIG. 1 except that each laser 4, 7 has been moved to a central location 11. This central location may be, for example, a building housing the cross-coupler 2, for example a telephone exchange.

In this example, each laser 4 is connected to the respective modulator 5 via monomode optical fibre 12. Each laser 7 is connected to a centrally located coupler 13 (equivalent to the coupler 8) via a monomode optical fibre 14.

It will be seen from FIG. 2 that the terminal equipment is simplified by centrally locating the lasers 4, 7 so that the transmitter contains only a modulator 5 while each receiver contains a photodiode 9 and an IF filter 10. The central grouping of the lasers 7 allows them to be tuned at the central location.

Figure 3:
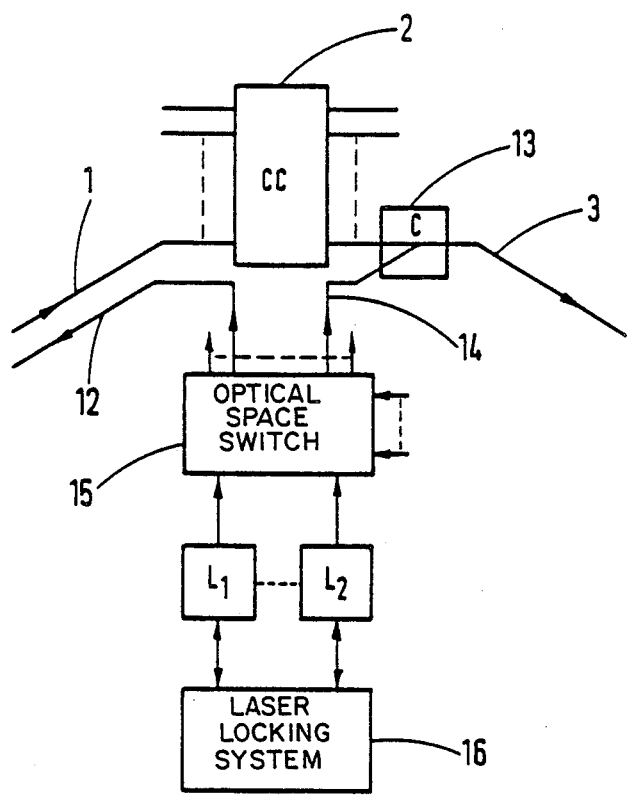
FIG. 3 illustrates a portion of a second example according to the invention.

A second example of a network according to the invention is partially illustrated in FIG. 3. This example constitutes a modification of the example shown in FIG. 2. In this example, instead of the lasers 4, 7 being associated with specific ones of the transmitters and receivers, the same number of lasers (2n) are connected into the network via an optical space switch 15. The space switch 15 is controlled by a means not shown to cause pairs of lasers to be connected to pairs of the transmitters and receivers. Although the lasers could be tunable to achieve broadcast communication for example, this arrangement enables them to be of a fixed wavelength. In the case of heterodyne detection, the fixed wavelengths of the laser of each pair will be different and separated in wavelength by the IF frequency. In the case of homodyne detection each laser of a pair of lasers would have the same wavelength different from all other pairs.

To ensure that the wavelengths of the signals generated by the lasers remain substantially constant a laser locking system 16 is provided to control the lasers. An example of such a system is illustrated in more detail in FIG. 6.

Typically, pairs of transmitters and receivers will be associated in which case networks corresponding to the example shown in FIG. 3 will require three optical fibres to achieve full connection between each receiving/transmitting station and the central location.

Figure 4:
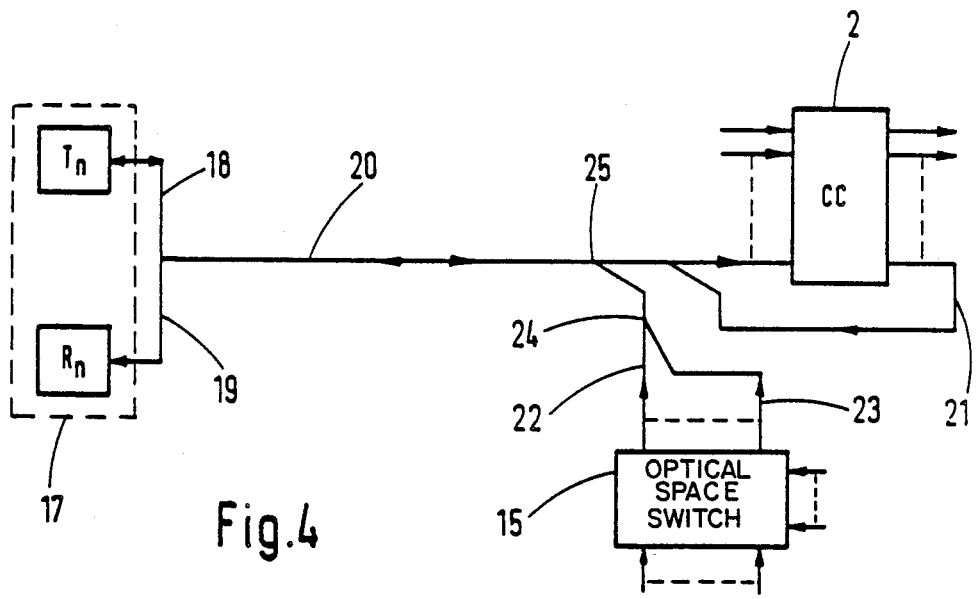
FIG. 4 illustrates a portion of a third example of a network according to the invention.

FIG. 4 illustrates a portion of a third example of a network according to the invention in which this problem is avoided.

In FIG. 4 a receiving/transmitting station 17 is shown comprising a transmitter $T_n$ and a receiver $R_n$. The transmitter and receiver are connected via monomode optical fibres 18, 19 to a single duplex optical monomode fibre 20 connected to the cross-coupler 2. An output fibre 21 (corresponding to the optical fibre 3 in the previous examples) is connected from the cross-coupler 2 to the optical fibre 20. A pair of optical fibres 22, 23 carrying the corresponding tuning and carrier signals respectively from the space switch 15 are connected together at 24 and to the optical fibre 20 at 25. The connection of the space switch 15 to the lasers (not shown) is as in FIG. 3.

In use, the space switch 15 selects an appropriate pair of laser output signals to constitute the tuning and carrier signals which are fed along the lines 22, 23 to the point 24 where they are wavelength multiplexed and fed onto the optical fibre 20 at 25 where further wavelength multiplexing takes place. The carrier signal is fed to the transmitter $T_n$ where it is modulated as previously described and then the modulated carrier signal is returned along the optical fibre 20 to the cross-coupler 2. Signals output from the cross-coupler 2 on the line 21 are also fed in wavelength multiplexed form along the optical fibre 20 and the optical fibre 19 to the receiver $R_n$ which retrieves the information as previously described by making use of the tuning signal.

Figure 5:
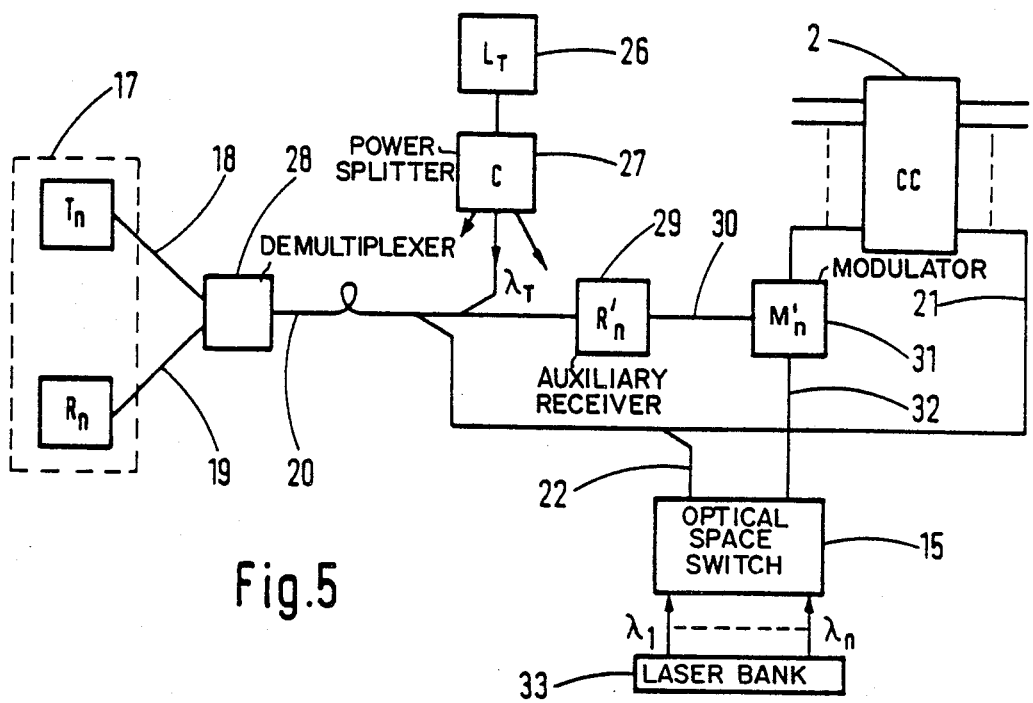
FIG. 5 illustrates a portion of a fourth example of a network according to the invention.

It is believed that the arrangement shown in FIG. 4 will demand a very high optical power budget. To reduce this problem a further network is proposed as shown in FIG. 5. In this example, a number of additional lasers 26 are provided to generate respective common carrier signals which are fed via associated power splitters 27 to each optical fibre 20 leading to respective sets of stations 17. (Only one additional laser 26 is shown in FIG. 5). A demultiplexer 28 is provided between the optical fibres 18,19 and the optical fibre 20. The common carrier signal is externally modulated by the modulator in the transmitter $T_n$ and the modulated common carrier signal is returned along the optical fibre 20 to a respective auxiliary receiver 29 at the central location. Each auxiliary receiver 29 ($R'_n$) generates an electrical output on a line 30 which drives a modulator 31 fed with the main carrier signal along a line 32 from the space switch 15. In another example (not shown) the modulator 31 could be controlled by optical signals from the receiver 29. As in the previous examples, the space switch 15 is fed with a range of different wavelength optical signals from a bank of lasers 33. In all other respects this example is the same as the example shown in FIG. 4.

The advantages of this arrangement are:
(1) the power budget available to the cross-coupler 2 is enhanced by approximately 28 dB to about 35 dB
(2) if $\lambda_T$ is spaced by say 10 nm or more from the switched lasers, simple filter or mux/demux techniques can be used
(3) the extra laser $L_T$ can be shared on a power basis
(4) now that the space switch 15 and modulators 31 are co-sited there is negligible signal delay between them. The space switch can be controlled in time to give the network a wavelength-time switching capability. Thus, for example, a wideband connection might demand the use of a pair of lasers full time. A low speed data connection on the other hand could use the selected lasers on a time shared basis.
(5) the electrical interface at the central point provides a convenient control access point.

It has been suggested in all the previous examples that each output of the cross-coupler 2 is connected to a receiver. This is not necessarily the case and, providing the loss budget permits, at least some of the outputs of the cross-coupler 2 may be linked to other cross-couplers in adjacent areas or to a remote gateway. A wavelength multiplex will automatically exist on the optical fibre and this permits a fibre efficient link network to be operated. If such linking occurs, the laser banks at different sites will need to be locked together to avoid cross-talk. To maintain the attraction of a fibre efficient network, the locking scheme needs to operate ideally over a single fibre.

Figure 6:
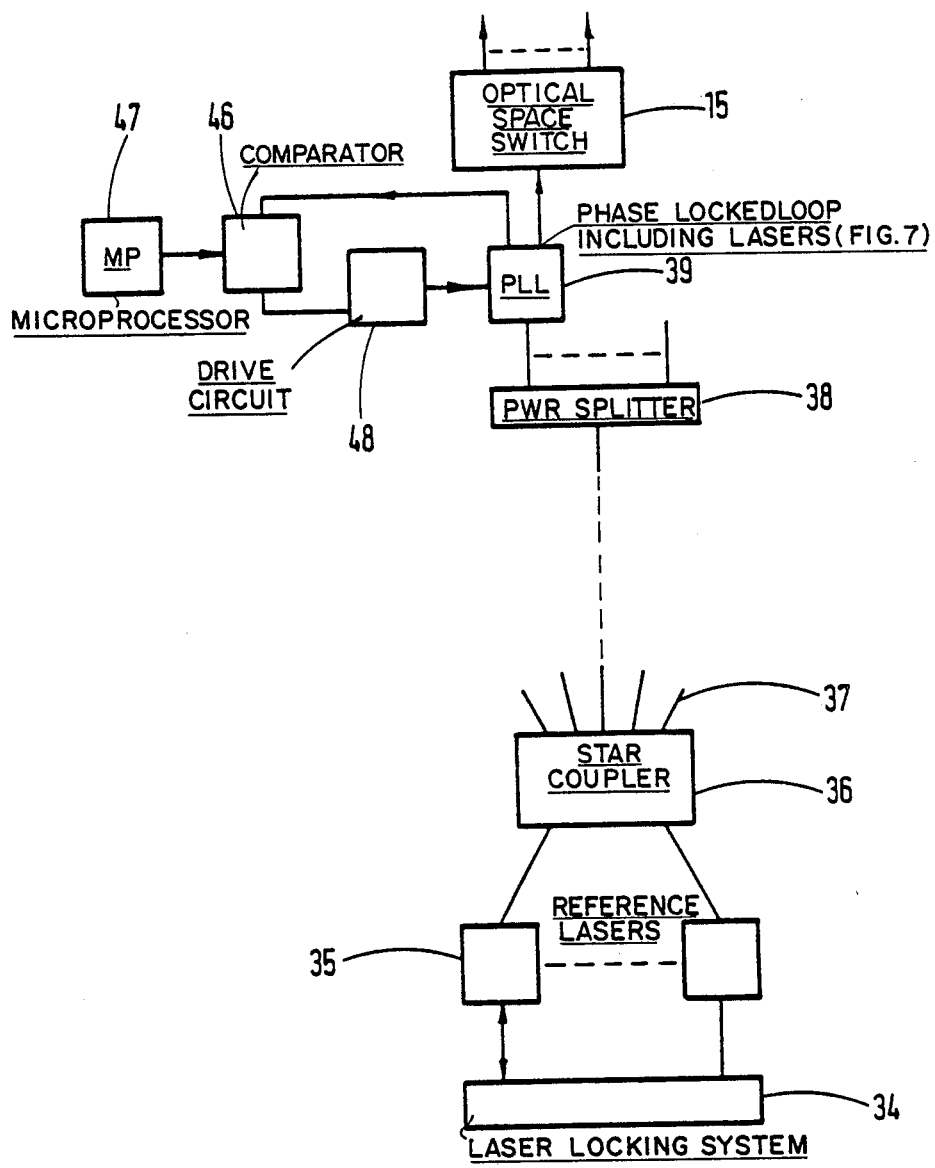
FIG. 6 illustrates a portion of a fifth example according to the invention; and, FIG. 7 is a block circuit diagram of the phase locked loop shown in FIG. 6.

An example of a locking system which could be applied to any of the examples shown in FIGS. 3 to 5 is illustrated in FIG. 6. A bank of reference lasers 35 is provided at a position remote from the bank of lasers 33 (FIG. 5) for example at a central exchange. Each reference laser output signal is fed to a locking system 34. The reference laser output signals are frequency modulated by changing the bias current frequency by a few kHz to impart a unique frequency modulation (identifier) to each signal. These identified reference signals are fed to a star coupler 36 where they are multiplexed so that identical multiplexed signals are fed along the plurality of fibres 37 to respective power splitters 38. There is one power splitter 38 for each bank of lasers 33.

Figure 7:
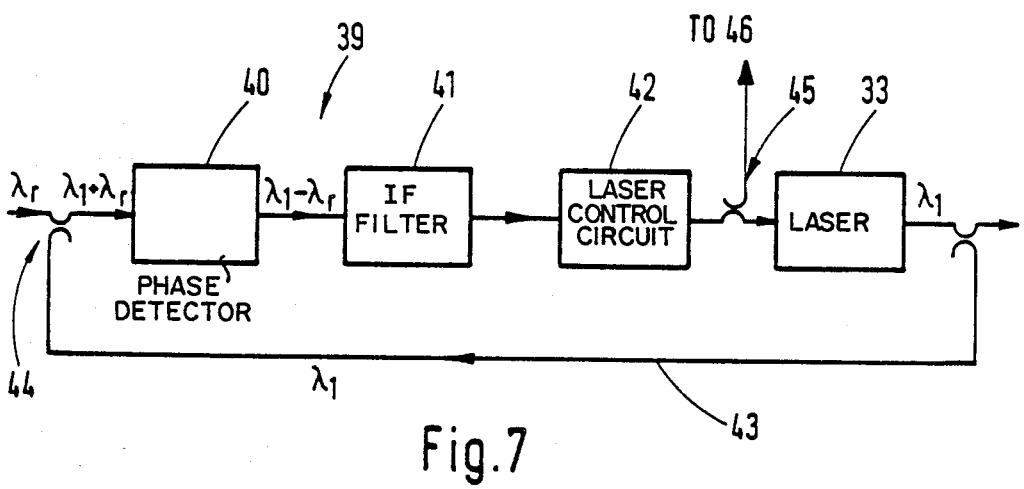

Each laser 33 is positioned in a phase locked loop 39 shown in more detail in FIG. 7. The reference signal is fed to a phase detector 40 whose output is fed to an IF filter 41 which feeds a laser control circuit 42. The laser control circuit 42 controls the bias current applied to the laser 33. The output signal from the laser 33 is sampled and fed back along an optical fibre 43 to a coupling point 44 where it is combined with the incoming reference signal. The output of the laser control circuit 42 is sampled at a coupling point 45, the sampled signal being fed to a comparator 46 (FIG. 6). The signal fed to the comparator 46 is effectively the identifier carried on the reference signal. A microprocessor 47 stores all possible identifiers which are fed in turn to the comparator 46 and compared with the signal from the phase locked loop 39. In this way, the comparator 46 determines which reference signal the laser 33 has locked onto. If the laser 33 has locked onto an incorrect reference signal then the microprocessor 47 causes a drive circuit 48 to readjust the laser frequency to the correct reference frequency. It should be understood that there will a separate phase locked loop 39, comparator 46, and drive circuit 48 for each laser 33 but the microprocessor 47 can be common to all the comparators 46.

The laser locking systems 16 and 34 may take any convenient form. Examples are discussed in "The Application of Coherent Optical Techniques to Broadband Networks" by G. R. Hill and I. W. Stanley, 2nd International Technical Symposium on Optical and Electro-optical Science and Engineering at Cannes, November 1985.

In all these examples various modulation techniques may be used.

In a link to a terminal there are likely to be both fixed and varying changes in the polarisation of a received optical signal if polarisation holding fibre is to be avoided. The standard modulation methods of ASK, PSK, and FSK of the optical E field may be used. These all require polarisation correction to be applied before the heterodyne signal is combined with the information signal to ensure reliable performance.

We claim:

1. An optical network comprising a plurality of distributed terminals including information transmitting and receiving terminals; transmitting and receiving terminal coupling means for optically coupling modulated carrier signals from transmitting terminals to receiving terminals; a plurality of optical sources grouped remotely from the distributed terminals; and means for optically coupling selected optical sources to the terminals to provide carrier signals to transmitting terminals for modulation and reference signals to receiving terminals to enable selection of a modulated carrier signal for reception, whereby local optical sources are not required in the transmitting terminals for supplying carrier signals and are not required in the receiving terminals to enable selection of a modulated carrier signal, wherein one of the sources is coupled to feed a common carrier signal to each of a plurality of the transmitting terminals, the network further comprising a plurality of auxiliary receiving terminals grouped together, each auxiliary receiving terminal being associated with a respective transmitting terminal for receiving a modulated common carrier signal from that respective transmitting terminal and for controlling modulating means to modulate another carrier signal associated with that transmitting terminal in response to the received modulated common carrier, the modulated associated carrier signal being fed to the terminal coupling means.

2. An optical network comprising a plurality of distributed terminals including information transmitting and receiving terminals; transmitting and receiving terminal coupling means for optically coupling modulated carrier signals from transmitting terminals to receiving terminals; a plurality of optical sources grouped remotely from the distributed terminals; and means for optically coupling selected optical sources to the terminals to provide carrier signals to transmitting terminals for modulation and reference signals to receiving terminals to enable selection of a modulated carrier signal for reception, whereby local optical sources are not required in the transmitting terminals for supplying carrier signals and are not required in the receiving terminals to enable selection of a modulated carrier signal, and wherein a transmitting terminal and a receiving terminal are located together to form a transceiver station; and the means for optically coupling selected sources to the terminals includes a duplex optical waveguide connected to the station and wavelength multiplexing means for feeding multiplexed carrier and reference signals from the grouped sources via the waveguide to the station; and the station further includes means for separately coupling the carrier and reference signals from the duplex waveguide to its transmitting and receiving terminals, respectively, and further wherein one of the sources is coupled to feed a common carrier signal to each of a plurality of the transmitting terminals, the network further comprising a plurality of auxiliary receiving terminals grouped together, each auxiliary receiving terminal being associated with a respective transmitting terminal for receiving a modulated common carrier signal from that respective transmitting terminal and for controlling modulating means to modulate another carrier signal associated with that transmitting terminal in response to the received modulated common carrier, the modulated associated carrier signal being fed to the terminal coupling means.

3. An optical network according to claim 1 or claim 2 wherein the optical sources comprise a first group for providing carrier signals to transmitting terminals and a second group for providing reference signals to receiving terminals.

4. An optical network according to claim 3 including switch means for selecting which source is coupled to which terminal.

5. An optical network according to claim 4 including time sharing means for controlling the switch means to couple an optical source to each of a plurality of terminals in time dependent sequence.

6. An optical network according to claim 1 or claim 2 further comprising locking means for maintaining the wavelength of the optical signals from the optical sources substantially constant.

7. An optical network according to claim 6 wherein the locking means comprises a plurality of second remote sources of optical signals for supplying reference carrier signals with respective unique identifiers to the first sources, the network further comprising tuning control means for identifying the respective reference carrier signals associated with each first source and for adjusting the output of the first sources to correspond with the respective identified reference carrier signals.

8. An optical network according to claim 1 or claim 2 wherein monomode optical fibres are used to optically couple the terminals and optical sources.

9. An optical network comprising a plurality of transmitting and receiving terminals; transmitting and receiving terminal coupling means, the transmitting and receiving terminals being optically coupled with the transmitting and receiving terminal coupling means whereby modulated carrier signals transmitted from the transmitting terminals are fed to the receiving terminals via the transmitting and receiving terminal coupling means; selection means associated with each receiving terminal to select the modulated carrier signal to be received; and a plurality of first sources of optical signals grouped together and optically coupled with the transmitting terminals to supply carrier signals to the transmitting terminals, wherein one of the first sources is coupled to feed a common optical carrier signal to all the transmitting terminals, the network further comprising a plurality of auxiliary receiving terminals grouped together, each auxiliary receiving terminal being associated with a respective transmitting terminal for receiving a modulated common carrier signal from that respective transmitting terminal and for controlling modulating means to modulate another carrier signal associated with that transmitting terminal in response to the received modulated common carrier, the modulated associated carrier signal being fed to the transmitting and receiving terminal coupling means.

10. A network according to claim 9, further comprising locking means for maintaining the wavelength of the optical signals from the optical sources substantially constant.

11. A network according to claim 10, wherein the locking means comprises a plurality of second remote sources of optical signals for supplying reference carrier signals with respective unique identifiers to the first sources, the network further comprising tuning control means for identifying the respective reference carrier signals and for adjusting the output of the first sources to correspond with identified reference signals.

12. A network according to claim 9 wherein monomode optical fibres are used to optically couple the terminals and optical sources.

* * * * *